US010116406B2

(12) United States Patent
Nuss et al.

(10) Patent No.: US 10,116,406 B2
(45) Date of Patent: Oct. 30, 2018

(54) METHOD AND APPARATUS FOR REDUCING INTER-CELL INTERFERENCE

(71) Applicant: Intucell Ltd., Natanya (IL)

(72) Inventors: Ziv Nuss, Tzur Yigal (IL); Tuvia Apelewicz, Ra'Anana (IL)

( * ) Notice: Subject to any disclaimer, the term of this patent is extended or adjusted under 35 U.S.C. 154(b) by 0 days.

(21) Appl. No.: 15/251,471

(22) Filed: Aug. 30, 2016

(65) Prior Publication Data

US 2016/0373202 A1     Dec. 22, 2016

Related U.S. Application Data

(63) Continuation of application No. 14/435,166, filed as application No. PCT/IL2013/000080 on Oct. 23, 2013, now Pat. No. 9,559,798.

(30) Foreign Application Priority Data

Oct. 25, 2012    (IL) .......................................... 222709

(51) Int. Cl.
*H04W 4/00* (2018.01)
*H04J 11/00* (2006.01)
(Continued)

(52) U.S. Cl.
CPC ......... *H04J 11/0053* (2013.01); *H04J 11/005* (2013.01); *H04L 1/1812* (2013.01);
(Continued)

(58) Field of Classification Search
USPC .......................... 370/252, 311, 315, 277, 329
See application file for complete search history.

(56) References Cited

U.S. PATENT DOCUMENTS

| 6,141,565 A | 10/2000 | Feuerstein et al. |
| 6,771,934 B2 | 8/2004 | Demers |

(Continued)

FOREIGN PATENT DOCUMENTS

| CN | 1468500 A | 1/2004 |
| CN | 102484875 A | 5/2012 |
| WO | 2011/098121 A1 | 8/2011 |

OTHER PUBLICATIONS

U.S. Appl. No. 15/089,252, filed Apr. 1, 2016, entitled "Method and System for Dynamic Allocation of Resources in a Cellular Network,".

(Continued)

*Primary Examiner* — Phuongchau Ba Nguyen

(57) ABSTRACT

A method is described for reducing interferences in a wireless network, by: identifying cells which experience more interference than others; identifying a group of PRBs that their transmissions are subjected to more interference than other concurrent transmissions; identifying UEs associated with the group of PRBs, and determining whether the location of the UEs is at the cells' edges; selecting a pair of UEs where one member is located at a first cell's edge and the other is located either (i) at a second cell, not included within a neighbors' list of the first cell, or (ii) at the core or remote edge of a second cell. In case (i), the second cell is introduced to the first cell neighbors' list, and in case (ii) the other UE is falsely defined as a UE located at the near second cell's edge. Then, ICIC procedure is invoked for that pair of UEs.

20 Claims, 9 Drawing Sheets

(51) Int. Cl.
- *H04W 16/10* (2009.01)
- *H04W 72/08* (2009.01)
- *H04L 1/18* (2006.01)
- *H04W 36/00* (2009.01)
- *H04W 84/04* (2009.01)

(52) U.S. Cl.
CPC ....... *H04W 16/10* (2013.01); *H04W 36/0061* (2013.01); *H04W 72/082* (2013.01); *H04W 84/042* (2013.01); *H04W 84/045* (2013.01)

(56) References Cited

U.S. PATENT DOCUMENTS

| | | |
|---|---|---|
| 7,151,937 B2 | 12/2006 | Jin et al. |
| 7,379,739 B2 | 5/2008 | Rajkotia et al. |
| 7,884,763 B2 | 2/2011 | Na et al. |
| 7,974,652 B2 | 7/2011 | Gerlach |
| 7,983,667 B2 | 7/2011 | Hart et al. |
| 8,045,996 B2 | 10/2011 | Brunner et al. |
| 8,086,180 B2 | 12/2011 | Chiu et al. |
| 8,107,950 B2 | 1/2012 | Amerijoo et al. |
| 8,170,544 B1 | 5/2012 | Satapathy et al. |
| 8,194,630 B2 | 6/2012 | Qvarfordt |
| 8,229,451 B2 | 7/2012 | Frenger et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 | 7/2013 | Dimou |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,983,470 B1 | 3/2015 | Ryan |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,219,816 B2 | 12/2015 | Grayson |
| 9,313,004 B2 | 4/2016 | Yanover et al. |
| 9,332,458 B2 | 5/2016 | Nuss et al. |
| 9,344,970 B2 | 5/2016 | Uplenchwar et al. |
| 9,414,310 B2 | 8/2016 | Grayson |
| 9,559,798 B2 * | 1/2017 | Nuss ............. H04W 16/10 |
| 2002/0061742 A1 | 5/2002 | Lapaille |
| 2004/0085909 A1 | 5/2004 | Soliman |
| 2004/0213170 A1 | 10/2004 | Bremer |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2006/0292989 A1 | 12/2006 | Gerlach |
| 2007/0008885 A1 | 1/2007 | Bonner |
| 2007/0177501 A1 | 8/2007 | Papasakellariou |
| 2007/0253372 A1 | 11/2007 | Nakayasu |
| 2007/0280170 A1 | 12/2007 | Kawasaki |
| 2008/0004028 A1 | 1/2008 | Vincent |
| 2008/0043623 A1 | 2/2008 | Franceschini |
| 2008/0084844 A1 | 4/2008 | Reznik |
| 2008/0107074 A1 | 5/2008 | Salmenkaita et al. |
| 2008/0139197 A1 | 6/2008 | Misra et al. |
| 2008/0188265 A1 | 8/2008 | Carter et al. |
| 2008/0268833 A1 | 10/2008 | Huang |
| 2009/0054047 A1 | 2/2009 | Kylvaja |
| 2009/0067370 A1 | 3/2009 | Kim |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0110989 A1 | 5/2010 | Wu |
| 2010/0112982 A1 | 5/2010 | Singh et al. |
| 2010/0124930 A1 | 5/2010 | Andrews |
| 2010/0177722 A1 | 7/2010 | Guvenc |
| 2010/0227611 A1 | 9/2010 | Schmidt et al. |
| 2010/0233962 A1 | 9/2010 | Johansson |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0285795 A1 | 11/2010 | Whinnett |
| 2010/0309864 A1 | 12/2010 | Tamaki |
| 2010/0311449 A1 | 12/2010 | Whinnett |
| 2010/0317351 A1 | 12/2010 | Gerstenberger |
| 2011/0039539 A1 | 2/2011 | Maida et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0092209 A1 | 4/2011 | Gaal |
| 2011/0098072 A1 * | 4/2011 | Kim ................. H04L 5/0032 455/509 |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0151881 A1 | 6/2011 | Chou |
| 2011/0176497 A1 | 7/2011 | Gopalakrishnan |
| 2011/0182375 A1 | 7/2011 | Kim et al. |
| 2011/0194423 A1 | 8/2011 | Cho |
| 2011/0195724 A1 | 8/2011 | Lee et al. |
| 2011/0195732 A1 | 8/2011 | Kim |
| 2011/0201277 A1 | 8/2011 | Eguchi |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2011/0306347 A1 | 12/2011 | Choi |
| 2011/0310879 A1 | 12/2011 | Wu |
| 2011/0317742 A1 | 12/2011 | Kawahatsu |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046028 A1 | 2/2012 | Damnjanovic |
| 2012/0046063 A1 | 2/2012 | Chande |
| 2012/0083201 A1 | 4/2012 | Truong |
| 2012/0087247 A1 | 4/2012 | Min et al. |
| 2012/0087266 A1 | 4/2012 | Vajapeyam |
| 2012/0100849 A1 | 4/2012 | Marisco |
| 2012/0129537 A1 | 5/2012 | Liu et al. |
| 2012/0157155 A1 | 6/2012 | Cho |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0236774 A1 | 9/2012 | Guey et al. |
| 2012/0238263 A1 | 9/2012 | Caretti et al. |
| 2012/0243431 A1 * | 9/2012 | Chen ............. H04W 72/0406 370/252 |

(56) References Cited

U.S. PATENT DOCUMENTS

| | | |
|---|---|---|
| 2012/0258720 A1 | 10/2012 | Tinnakornsurisphap et al. |
| 2012/0265888 A1 | 10/2012 | Roeland et al. |
| 2012/0270536 A1 | 10/2012 | Ratasuk |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0029669 A1 | 1/2013 | Boudreau et al. |
| 2013/0044704 A1 | 2/2013 | Pang |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0109380 A1 | 5/2013 | Centonza |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0157680 A1 | 6/2013 | Morita |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0279403 A1 | 10/2013 | Takaoka |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0087747 A1 | 3/2014 | Kronestedt |
| 2014/0092765 A1 | 4/2014 | Agarwal et al. |
| 2014/0112251 A1 | 4/2014 | Kim et al. |
| 2014/0113643 A1 | 4/2014 | Ma et al. |
| 2014/0126537 A1 | 5/2014 | Chen et al. |
| 2014/0146732 A1 | 5/2014 | Olufunmilola et al. |
| 2014/0148149 A1 | 5/2014 | Kwan |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0170965 A1 | 6/2014 | Li |
| 2014/0171143 A1 | 6/2014 | Liu |
| 2014/0185467 A1 | 7/2014 | Heo |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0219197 A1 | 8/2014 | Chaudhuri |
| 2014/0220990 A1 | 8/2014 | Lorca Hernando |
| 2014/0226736 A1 | 8/2014 | Niu et al. |
| 2014/0233468 A1 | 8/2014 | Hejazi |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0293906 A1 | 10/2014 | Chang et al. |
| 2014/0302859 A1 | 10/2014 | Nama |
| 2014/0307685 A1 | 10/2014 | Takano |
| 2014/0328277 A1 | 11/2014 | Xiao et al. |
| 2014/0335909 A1 | 11/2014 | Czerepinski |
| 2015/0011222 A1 | 1/2015 | Brisebois et al. |
| 2015/0011229 A1 | 1/2015 | Morita et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063223 A1 | 3/2015 | Shen et al. |
| 2015/0063231 A1 | 3/2015 | Seo et al. |
| 2015/0087325 A1 | 3/2015 | Nuss et al. |
| 2015/0105025 A1* | 4/2015 | Zhang ............... H01Q 3/26 455/63.4 |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0237588 A1 | 8/2015 | Zhao et al. |
| 2015/0237637 A1* | 8/2015 | Venkatraman ...... H04W 72/082 370/329 |
| 2015/0256314 A1 | 9/2015 | Gauvreau et al. |
| 2015/0312778 A1 | 10/2015 | Chandrasekhar et al. |
| 2015/0318994 A1 | 11/2015 | Walsh et al. |
| 2015/0351072 A1 | 12/2015 | Okmyanskiy et al. |
| 2015/0365855 A1 | 12/2015 | Nuss et al. |
| 2015/0373698 A1 | 12/2015 | Uplenchwar et al. |
| 2015/0382367 A1 | 12/2015 | Yanover et al. |
| 2016/0073426 A1 | 3/2016 | Bull et al. |

OTHER PUBLICATIONS

U.S. Appl. No. 14/818,084, filed Aug. 4, 2015 entitled "Resource Adaptation for Frequency Domain Downlink Inter-Cell Interference Coordination," Inventors: Ritesh K. Madan et al.

U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.

U.S. Appl. No. 14/811,580, filed Jul. 28, 2015 entitled "Determining Fractional Frequency Reuse Power Levels for Downlink Transmissions," Inventor: Ritesh K. Madan.

U.S. Appl. No. 14/816,957, filed Aug. 3, 2015 entitled "Selecting Cells for Downlink Inter-Cell Interference Coordination," Inventors: Rohit U. Nabar et al.

U.S. Appl. No. 14/816,990, filed Aug. 3, 2015 entitled "User Equipment Power Level Selection for Downlink Transmissions," Inventors: Vikram Chandrasekhar et al.

U.S. Appl. No. 14/679,868, filed Apr. 6, 2015, entitled "System and Method for Managing Interference in a Network Environment Based on User Presence," Inventors: Mark Grayson, et al.

U.S. Appl. No. 14/687,198, filed Apr. 15, 2015, entitled "System and Method for Managing Interference in a Network Environment Based on User Presence," Inventors: Mark Grayson, et al.

U.S. Appl. No. 14/686,598, filed Apr. 14, 2015, entitled "System and Method for Providing Uplink Inter Cell Interference Coordination in a Network Environment," Inventors: Ritesh K. Madan, et al.

U.S. Appl. No. 14/691,260, filed Apr. 20, 2015, entitled "System and Method for Providing Uplink Inter Cell Interference Coordination in a Network Environment," Inventors: Ritesh K. Madan, et al.

U.S. Appl. No. 14/809,201, filed Jul. 25, 2015, entitled "System and Method to Facilitate Small Cell Uplink Power Control in a Network Environment," Inventors: Ritesh K. Madan, et al.

U.S. Appl. No. 14/833,519, filed Aug. 24, 2015, entitled "System and Method to Facilitate Small Cell Uplink Powercontrol in a Network Environment," Inventors: Ritesh K. Madan, et al.

U.S. Appl. No. 14/918,420, filed Oct. 20, 2015, entitled "System and Method for Frequency and Time Domain Downlink Inter-Cell Interference Coordination," Inventors: Ritesh K. Madan, et al.

U.S. Appl. No. 14/951,987, filed Nov. 25, 2015, entitled "System and Method for Frequency and Time Domain Downlink Inter-Cell Interference Coordination," Inventors: Ritesh K. Madan, et al.

(56) References Cited

OTHER PUBLICATIONS

U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Feb. 8, 2016, entitled "Mitigation of Uplink Interference Within Heterogeneous Wireless Communications Networks," Inventor: Pankaj Uplenchwar, et al.
U.S. Appl. No. 14/801,381, filed Jul. 16, 2015, entitled "System and Method to Manage Network Utilization According to Wireless Backhaul and Radio Access Network Conditions," Inventor: Ishwardutt Parulkar.
"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.
"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.
"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.
"ETSI TS 123 401 V12.70 (Jan. 2015) Technical Specification: "LTE; General Packet Radio Service (GPRS) enhancements for Evolved Universal Terrestrial Radio Access Network (E-UTRAN) access (EGPP TS 23.401 version 12.7.0 Release 12), Section 4 only, European Telecommunications Standards Institute, 650 Route des Lucioles, F-06921 Sophia Antipolis Cedex, France; Jan. 2015; 77 pages.
"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.
"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.
"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].
ETSI TS 125 367 V9.4.0, "Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.
ETSI TS 125 469 v11.2.0, "Universal Mobile Telecommunications System (UMTS); UTRAN Iuh interface Home Node B (HNB); Application Part (HNBAP) signalling (3GPP T525.469 version 11.2.0 Release 11)," European Telecommunications Standards Institute, 650 Route des Lucioles, F-06921 Sophia Antipolis Cedex, France, Apr. 2013, 78 pages.
"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting

(56) References Cited

OTHER PUBLICATIONS packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015; Sections 1 thru 9 only; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.
"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F-06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.

(56) References Cited

OTHER PUBLICATIONS

"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.

"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.

"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.

"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.

"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.

"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.

U.S. Appl. No. 15/374,903, filed Dec. 9, 2016, entitled "Power Management in a Cellular System," Inventors: Alan James Auchmuty Carter, et al.

U.S. Appl. No. 15/335,931, filed Oct. 27, 2016, entitled "Power Setting," Inventor: Pankaj Uplenchwar, et al.

English translation of the First Office Action in corresponding Chinese Application No. 201380056007.9, dated Dec. 4, 2017, 6 pages.

* cited by examiner

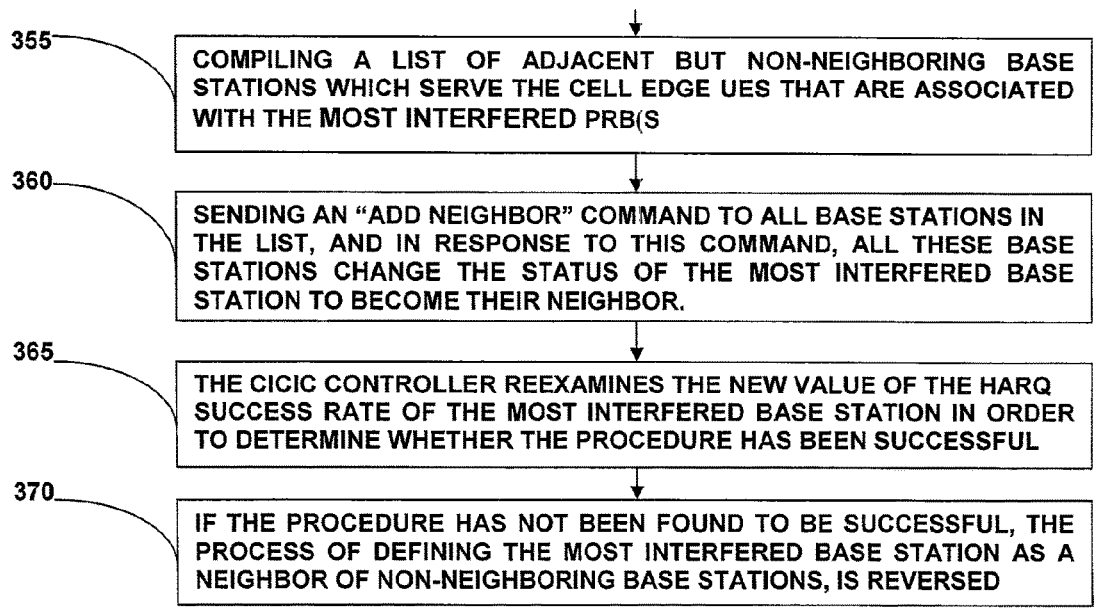
FIG. 3 - CONT.

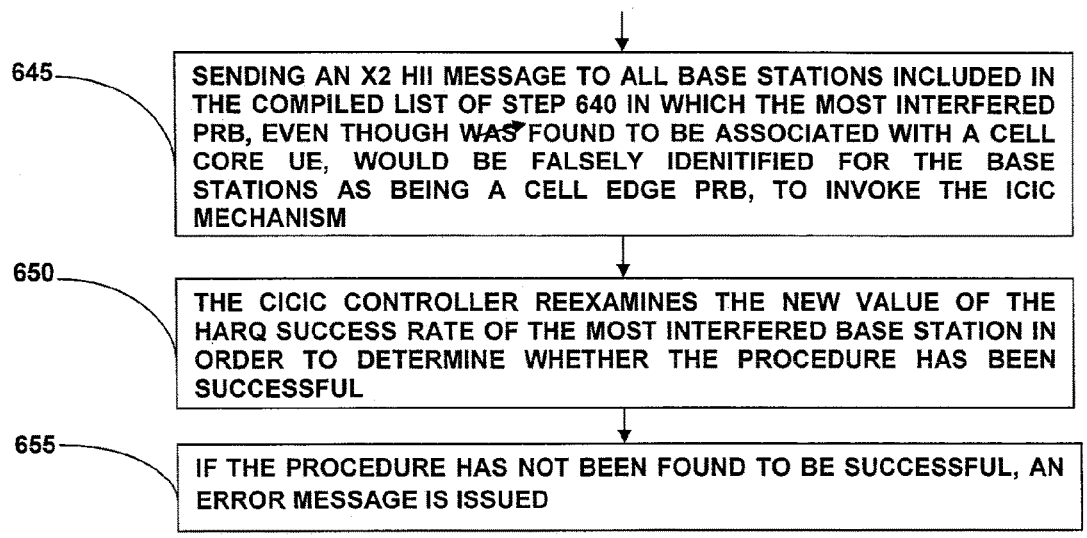
Fig. 6 - CONT.

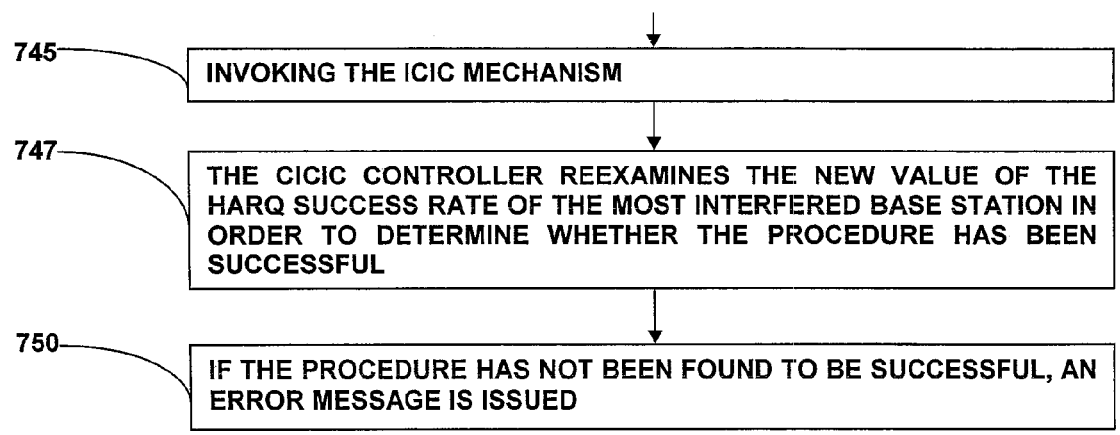
Fig. 7 - CONT.

METHOD AND APPARATUS FOR REDUCING INTER-CELL INTERFERENCE

CROSS-REFERENCE TO RELATED APPLICATIONS

This application is a continuation (and claims the benefit of priority under 35 U.S.C. § 120) of U.S. application Ser. No. 14/435,166, filed 12 Apr. 2015, entitled "METHOD AND APPARATUS FOR REDUCING INTER-CELL INTERFERENCE," which claims priority to the national stage application under 35 U.S.C. § 371 of PCT International Application Serial No. PCT/IL2013/000080, filed on 23 Oct. 2013 and entitled "METHOD AND APPARATUS FOR REDUCING INTER-CELL INTERFERENCE," which application is based on and claims the benefit of priority of Israeli Patent Application No. 222709 filed on 25 Oct. 2012. The disclosures of the prior applications are considered part of and are hereby incorporated by reference in their entirety in the disclosure of this application.

TECHNICAL FIELD

The invention relates to a system and a method for managing wireless networks, and in particularly to management of interference in cellular mobile communication systems.

BACKGROUND

In current cellular mobile broadband systems the achievable data rates are strongly dependent on the users' positions in the network.

Even though it is of great importance to deliver the same user experience across the whole cellular network in order to meet the users' expectations, still, a considerable gap is observed between cell-edge and cell-core performance due to inter-cell interference, which poses the main limitation of state-of-the art mobile networks.

Long Term Evolution ("LTE") is the 4th generation cellular mobile system that is being developed and specified in 3GPP as a successor of the Universal Mobile Telecommunications System ("UMTS") standard which was adopted by third generation mobile cellular systems for networks based on the GSM standard. LTE is specified as frequency reuse-1 system designed to achieve maximum gain and efficient use of frequency resources. On one hand, the optimal use of resources provides higher bit rates while on the other hand it generates Inter Cell Interference (ICI) issues associated with the reuse-1 type of deployment. In the absence of any interference mitigation or coordination mechanism, ICI becomes critical in LTE, and as described above, especially on cell borders. Therefore, a number of schemes have been suggested for the mitigation solution of ICI, and are typically classified as static and dynamic on the basis of their type of interference coordination mechanisms.

One of these types is centralized ICIC ("cICIC") which has the advantage of addressing interference issues that distributed ICIC ("dICIC"), which is implemented at the eNodeB level, is incapable of handling.

The evolution of the physical layer of the cellular radio access has reached nowadays a level where operation close to theoretical limits of achievable spectral efficiency for a given signal to interference-and-noise (SINR) ratio, becomes feasible. Thus, significant increases in spectral efficiency can be achieved only by improving the SINR through minimization of the interference.

The 3GPP LTE Recommendation defines two types of interference minimization techniques. The first one being interference minimization by interference reduction, whereas the second one is interference minimization by inter cell interference coordination (ICIC). The 3GPP standard handles the two types of interference minimization differently. The first type, interference reduction, is used in conjunction with coverage and capacity optimization. The interference reduction is done by implementing RF techniques such as antenna tilt, transmit power reduction, and handover mechanisms. The second type, ICIC, is used exclusively for cell edge user equipment (UE), to which the same Physical Resource Blocks (PRBs) have been assigned by the serving wireless cell as those assigned in other wireless cells to their associated UEs that cause the interference.

The LTE Recommendation has defined a new interface between base stations to enable the transfer of ICIC function indicators. This interface is referred to as X2. These function indicators are: Relative Narrowband Transmit Power Indicator ("RNTPI"), High Interference Indicator ("HII"), and Interference Overload Indicator ("OI").

The RNTPI indicator message is sent to neighbor base stations (referred to herein as "eNBs"). It contains one bit per each Physical Resource Block (PRB) in the downlink transmission, which indicates if the transmission power associated with that PRB will be greater than a pre-defined threshold. Thus, neighbor eNBs may anticipate which bands would suffer more severe interference and take the appropriate scheduling decisions immediately, rather than wait to receive and rely on the UEs' Channel Quality Information ("CQI") reports.

The HII indicator for uplink transmissions has a somewhat similar function as that which was described above in connection with the RNTPI message for downlink transmissions. There is one bit per each PRB, enabling the neighboring eNBs to assess whether they should expect high interference power in the near future. Typically, only PRBs that are assigned to cell-edge UEs are indicated by these messages. Reference Signal Received Power ("RSRP") measurements which are reported as part of handover measurement reports, can identify cell edge UEs. In a similar manner, this indicator can be used to identify the bands used in a frequency partitioning scheme.

While the previously described X2 messages are sent out proactively by the eNBs, the overload indicator ("OI") is only triggered when high-interference in the uplink direction is detected by an eNB. In such a case, an overload indication will be sent to neighbor eNBs whose UEs are potentially the source of this high interference. The message contains a low, medium or high interference level indication per each PRB. However, the question, which cell is the one responsible for the high interference is of course not a trivial question to answer.

According to 3GPP TS 36300-970, Inter-cell interference coordination is associated with managing radio resources (notably the radio resource blocks) such that inter-cell interference is kept under control. ICIC is inherently a multi-cell, radio resource management ("RRM") function that needs to take into account information (e.g. the resource usage status and traffic load situation) obtained from various cells. Furthermore, an ICIC method may be different in the uplink and downlink.

3GPP release 10 introduces a new LTE network concept which is defined as heterogeneous networks ("HetNet"), in contrast to previous network releases which deal with homogeneous networks. HetNet is defined as a network of eNBs with different capabilities, most importantly, different Tx-power classes.

However, heterogeneous networks pose new ICIC challenges. A first ICIC challenge involves Macro UE that roams about a Home eNB (HeNB) and is not part of the closed subscriber group ("CSG"). In that scenario the Macro eNB UE transmission will become uplink interference to the Home eNB authorized UEs. The second ICIC challenge is Macro eNB transmission to cell edge UEs that forms downlink interference to Pico eNB center cell UE. In order to enable the use of HetNet, enhanced ICIC (eICIC) Rel. 10 requires that all members of a HetNet (Macro, Pico, HeNB) should be capable of interconnecting by using the X2 interface.

Another major problem is that the ICIC is limited to data channels. Therefore, the recommendation does not provide sufficient protection for the downlink control channels in the two above-mentioned severe interference scenarios. Furthermore, range expansion has to be limited to small offsets between cells, in order to keep control channel errors at a reasonable level. Hence for Rel. 10 3GPP two new approaches were proposed to avoid heavy inter-cell interference on both data and control channels in the downlink direction. One is based on carrier aggregation with cross-carrier scheduling, while the other is based on time-domain multiplexing ("TDM") using so called almost blank subframes ("ABS").

Carrier Aggregation is one of the most important features of the LTE Advanced. Unlike LTE, it enables an LTE-A UE to connect to several carriers simultaneously. It not only allows resource allocation across carriers, it also allows implementing a scheduler based on fast switching between carriers without time consuming handover.

SUMMARY OF THE DISCLOSURE

The disclosure may be summarized by referring to the appended claims.

It is an object of the present invention to provide a method and apparatus to enable reducing interference in a wireless network.

It is another object of the present invention to provide a method and an apparatus to enable reducing interference in a wireless network by relying on information that relates to the most interfered groups of allocated radio resources.

It is still another object of the present invention to provide a method and an apparatus to enable reducing interference in a wireless network by forcing a change in the definitions of neighboring wireless cells and/or in the definitions of the classifications of user equipment within wireless cells.

Other objects of the present invention will become apparent from the following description.

According to one embodiment, there is provided a method for reducing inter-cell interferences in a wireless communication network comprising a plurality of wireless cells by invoking Inter-cell interference coordination ("ICIC") procedure, the method comprises the steps of:

(a) identifying one or more of the plurality of wireless cells which experience more interference than the remaining of the plurality of wireless cells;

(b) identifying at least one group of allocated radio resources (e.g. Physical Resource Block (PRB)) for transmission to/from the one or more identified wireless cells, and wherein transmissions made while utilizing the at least one identified group of allocated radio resources, are characterized as being subjected to more interference than concurrent transmissions made while utilizing the other groups of allocated radio resources for transmission to/from the one or more identified wireless cells;

(c) for each of the at least one identified group of allocated radio resources, identifying two or more user equipments (UEs) utilizing that group of allocated radio resources, and determining whether the location of at least one of the UEs is at the edge of a wireless cell at which the respective UE is provided with communication services;

(d) selecting one pair of UEs from among the two or more UEs, wherein the current location of one member of that pair of UEs is at an edge of a first wireless cell associated therewith and the current location of the other member of the UEs pairs is either:

i) located at a second wireless cell which is currently not included in a neighbors' list of the first wireless cell, or ii) located at a second wireless cell which is adjacent to the first wireless cell, as long as that other UE member is located away from the second wireless cell's edge which is located adjacent to an edge of the first wireless cell;

(d1) for a selected pair of UEs in which the other UE member is located at a second wireless cell currently not included of a neighbors' list of the first wireless cell (i.e. option (i)), including the second wireless cell in the neighbors' list of the first wireless cell;

(d2) for a selected pair of UEs in which the other UE member is located at a second wireless cell adjacent to the first wireless cell but away from the second wireless cell's edge which is adjacent to an edge of the first wireless cell (i.e. option (ii)), falsely defining that other member as being a UE located at the second wireless cell's edge which is adjacent to an edge of the first wireless cell; and (e) invoking an Inter-cell interference coordination procedure involving the selected pair of UEs, thereby reducing inter-cell interferences.

As will be appreciated by those skilled in the art, step (d1)/(d2) and step (e) may then be repeated for other such selected pairs.

In the following description, the wireless communication network is described in terms of a wireless network being in compliance with 3GPP Long Term Evolution (LTE) Recommendation. Nevertheless, it should be understood that the present invention is not restricted to this specific Recommendation (standard) but rather may be implemented in conjunction with any applicable standard, mutatis mutandis.

In LTE, both OFDMA (Orthogonal Frequency Division Multiple Access) and SC-FDMA (Single Carrier-Frequency Division Multiple Access) are defined. Both of them utilize 15 KHz subcarriers which are then grouped into Physical Resource Blocks (PRB), each containing 12 subcarriers which amounts to 180 KHz of the spectrum. The present invention relates to a group of allocated radio resources, which, as one of its options, when relating to the LTE Recommendation, is the equivalent of a Physical Resource Block (PRB). Although the following description is provided in terms of PRBs to ease on the reading, it should be understood that the invention is not limited to the networks complied with LTE recommendation, nor to the use of PRBs, and encompasses all applicable cases where there is a use of a group of allocated radio resources as meant herein.

According to another embodiment, step (a) of the method provided is triggered when the number of successful HARQ events associated with a given wireless cell divided by the sum of HARQ events associated with the given wireless cell (both successful and unsuccessful events) is less than the number of successful HARQ events divided by the sum of HARQ events (both successful and unsuccessful events) for the wireless cells included in a cluster of wireless cells to which the given cell belongs, less a pre-defined factor being a function of the standard deviation of the successful HARQ events divided by the sum of successful and unsuccessful HARQ events associated with the wireless cells belonging to that cluster.

In accordance with another embodiment, step (c) comprises retrieving information which relates to Radio Resource Control (RRC) Connection Setup for a plurality of UEs and based on the information retrieved, determining the UEs located at the most interfered wireless cell and the UEs associated with the most interfered PRBs.

By yet another embodiment, the step of determining whether the location of the one or more UEs is at the edge of its respective wireless cell, is based upon retrieving time adjustment (TA) and/or received signal strength power (RSSP) values of the UEs whose identities were established, and comparing each of the retrieved TA and RSSP values with predetermined threshold values, so that if the TA value is greater than a first pre-defined threshold value and/or the RSSP value is less than a second pre-defined value, the respective UE is determined to be located at the cell edge According to still another embodiment, step (d1) comprises utilizing the respective UE's RRC Connection Setup information in order to identify wireless cells that are not currently included in the neighbors' list of that wireless cell, but which comprise UEs that are associated with the most interfered PRB.

Step (d1) may further comprise comparing the TA and/or RSSP values of each UE connected to a wireless cell which is currently not included in the wireless cell's neighbors' list, to predetermined threshold values and if the respective TA value is greater than a first pre-defined threshold value, and/or the RSSP value is less than a second pre-defined value, determining that this UE is located at the cell edge of a wireless cell that is currently not included in its neighbors' list (e.g. an adjacent non-neighboring wireless cell).

By yet another embodiment, step (d1) further comprises identifying from among the UEs determined to be located at an edge of a respective wireless cell which is not currently included in the wireless cell's neighbors list, which one or more UEs are associated with the most interfered PRB(s).

According to another embodiment, step (e) comprises invoking an Inter-cell interference coordination (ICIC) procedure between the first and second wireless cells that are defined as being neighboring cells even though that the second wireless cell was not included in the neighbors' list of the first wireless cell prior to carrying out step (d1).

According to still another embodiment, step (e) comprises invoking an Inter-cell interference coordination (ICIC) procedure between the first and second wireless cells even though one of the interfering/interfered UEs is currently located at the core of its wireless cell.

In accordance with another embodiment, the method provided further comprising a step of monitoring high interference indicator (HII) messages sent from a plurality of wireless cells, wherein each of the HII messages comprises a list of PRBs that are scheduled for a cell edge UEs, and storing the PRBs together with the identities of their associated wireless cell and a timestamp indicating the time at which the HII message was sent.

Preferably, in step (d1) one or more wireless cells are identified as not being included in the neighbors' list of the first wireless cell, and wherein the identification is carried based on information that relates to the stored PRBs, the identities of their associated wireless cells and their respective timestamp.

In accordance with another embodiment, if by following step (c) it is determined that the one or more identified most interfered PRBs are not associated with UEs located at a cell edge, determining the identities of the UEs that are connected to the most interfered base station which are associated with the most interfered PRBs.

The values of the TA and the received signal strength power (RSSP) of each UE connected to an adjacent neighboring base station, are compared with predetermined threshold values and if the respective TA value is less than the first threshold value and the received signal strength power (RSSP) value is higher than the second value, determining that that UE is located at the cell core of the adjacent neighboring wireless cell thereof.

By yet another embodiment, the method further comprising a step of identifying the adjacent neighboring wireless cells that comprise identifications of cell core UEs connected thereto and associated with the one or more of the most interfered PRB(s).

In accordance with still another embodiment, the method provided further comprising a step of conveying an HII message to all of the identified adjacent neighboring wireless cells, wherein the most interfered PRB which was found to be associated with a cell core UE, will be falsely identified for the adjacent neighboring wireless cells as being a cell edge PRB, in order to enable invoking an Inter-cell interference coordination (ICIC) procedure, thereby reducing inter-cell interferences.

In accordance with still another embodiment, the method provided further comprises a step of changing the cell edge to cell core ratio of the wireless cell, wherein the most interfered PRB which was found to be associated with a cell core UE, will now be associated with a cell edge UE and will be categorized as cell edge PRB in order to enable invoking an Inter-cell interference coordination (ICIC) procedure, thereby reducing inter-cell interferences. In other words, in the case it is not possible to tag a UE as a cell core and if there exists a base station parameter that defines a ratio between cell edge and cell core, than by changing that parameter one is able to effectively force cell core UEs to be regarded as cell edge UEs without the need to send an artificial HII message.

In accordance with still another embodiment, the method provided further comprising a step of changing the tilt of the antenna associated with the wireless cell so that interference energy due to transmissions from/to other wireless cells is minimized.

According to another aspect, there is provided a controller adapted to reduce inter-cell interferences in a wireless communication network comprising a plurality of wireless cells, the controller is adapted to carry out the following operations:

(a) identify one or more of the plurality of wireless cells which experience more interference than the remaining of the plurality of wireless cells;

(b) identify at least one group of allocated radio resources transmitted to/from the one or more identified wireless cells, and wherein transmissions made while utilizing the at least one identified group of allocated radio resources, are characterized as being subjected to more interference than concurrent transmissions made while utilizing the other groups of allocated radio resources for transmission to/from the one or more identified wireless cells;

(c) for each of the at least one identified group of allocated radio resources, identify two or more user equipments (UEs) utilizing that group of allocated radio resources, and determine whether the location of at least one of these UEs is at the edge of a wireless cell at which the respective UE is provided with communication services;

(d) select one pair of UEs from among the two or more UEs, wherein the current location of one member of that pair of UEs is at an edge of a first wireless cell associated therewith and the current location of the other member of the UEs pairs is either:
   i) located at a second wireless cell which is currently not included in a neighbors' list of the first wireless cell, or
   ii) located at a second wireless cell which is adjacent to the first wireless cell, as long as that other UE member is located away from the second wireless cell's edge which is located adjacent to an edge of the first wireless cell;

(d1) for a selected pair of UEs in which the other UE member is located at a second wireless cell currently not included of a neighbors' list of the first wireless cell, include the second wireless cell in the neighbors' list of the first wireless cell;

(d2) for a selected pair of UEs in which the other UE member is located at a second wireless cell adjacent to the first wireless cell but away from the second wireless cell's edge which is adjacent to an edge of the first wireless cell, falsely define that other member as being a UE located at the second wireless cell's edge which is adjacent to an edge of the first wireless cell; and (e) invoke an Inter-cell interference coordination procedure involving the selected pair of UEs, thereby reducing inter-cell interferences.

Other aspects of the present invention such as certain features of the controller and a communication system, which are adapted to operate in accordance with the principles of the method described hereinabove, mutatis mutandis, are encompassed within the scope of the present invention.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Figure 1:
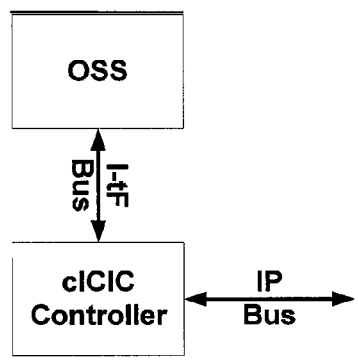
FIG. 1—is a schematic illustration of a schematic block diagram of an integrated cICIC controller.

Let us first consider FIG. 1, which illustrates a schematic example of a block diagram of an integrated cICIC controller. The centralized ICIC (referred to herein as "cICIC") controller is connected in this example to the network's Operation Support System ("OSS") via an It-FN bus interface, and sends, among many other messages, add/delete neighbor commands or HII messages or new threshold values to the appropriate base station cells via an IP bus.

The cICIC controller obtains from the OSS the mapping of all base station cells, their identification codes as well as their IP addresses and their associated neighbors' lists. In addition, the cICIC controller obtains from the OSS the number of hybrid automatic repeat request ("HARQ") success events and the number of HARQ unsuccessful (failed) events on a per wireless cell basis, i.e. the number of successful and unsuccessful combinations of high-rate forward error-correcting coding and ARQ error-control in each of a plurality of wireless cells (e.g. FDD cells). The number of HARQ events typically depends on the radio environment (higher noise level implies greater number of HARQ events) and on the user throughput requirements (less data entails less HARQ events). In order to eliminate the data throughput dependency, a success rate criteria which is defined as follows, may be used:

HARQ Success rate=HARQ success events/(HARQ success events+HARQ fail events)

The cICIC controller maps the deployed base stations into clusters (or alternatively the wireless cells at which the base stations are deployed), wherein each cluster includes at least one base station associated with at least one wireless cell. The cICIC controller than calculates, preferably on ongoing basis, the average HARQ success rate and the standard deviation of the HARQ success rate. If the HARQ success rate associated with a specific wireless cell is found to be less than the cluster's average HARQ success rate for the wireless cells included in that cluster less a factor which is a function of the standard deviation, an indication is triggered to alert the operator of this situation.

A large number of unsuccessful HARQ events (when compared with the number of successful HARQ events) are attributed to excessive interference. The interference may be classified into two types of interferences. The first, interference experienced by cell edge user equipments, UEs, caused by wireless cells which are not part of the neighbors' list, (e.g. by neighbors not included in the neighbors' list, by non-geographically adjacent wireless cells, etc.) in which the same PRBs are used. The second, interference to cell core user equipments caused by neighboring wireless cells which use the same PRBs while communicating with their cell core UEs.

For the convenience of the reader, reference will be made hereinafter to the first interference type as "Missing Neighbor interference", and the second interference type will be referred to as "Wrong PRB Mapping interference".

Figure 2:
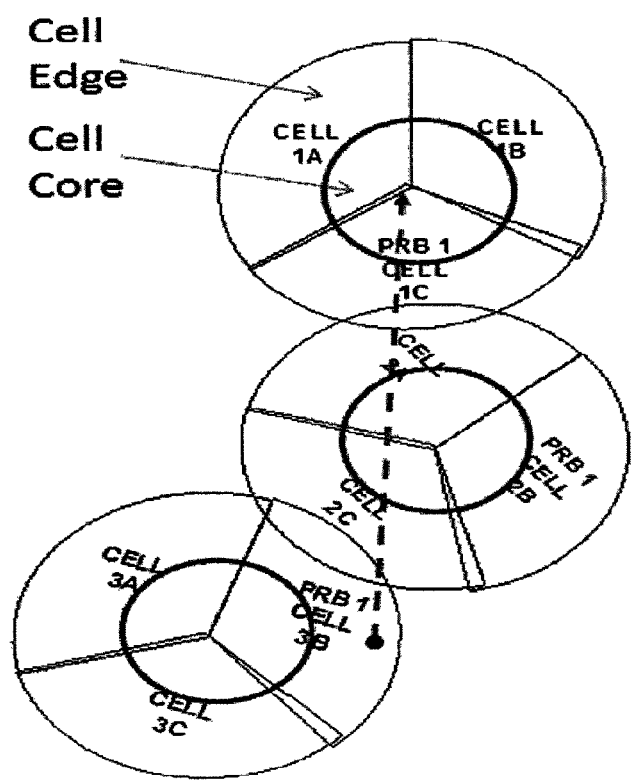
FIG. 2—demonstrates a schematic illustration of a configuration in which a missing neighbor interference type is possible.

FIG. 2 illustrates a configuration in which missing neighbor interference type mitigation is possible. In this missing neighbor interference scenario, cell 1C comprises a UE located at cell edge and to which PRB1 has been allocated. Cell 3B, which is not geographically adjacent to cell 1C and is not included in the neighbors' list of wireless cell 1C, also comprises a UE at its cell edge using PRB1. It is assumed for the sake of this example that the network radio conditions are such, that the UE in cell 1C does not consider cell 3B to be a valid cell for receiving radio services therefrom. Similarly the UE in cell 3B does not consider cell 1C to be a valid option for receiving services. Due to the fact that cells 1C and 3B are not geographical neighbors, the base station ICIC mechanism as known in the prior art is not activated, and consequently the RF transmission by/to the UE in cell 3B creates interference to the UE of cell 1C.

According to the solution provided herein for overcoming the missing neighbor interference problem, the potential missing neighbors are identified, they are then defined as neighbors of the given cell (even though, as explained above, they are not included in the neighbors' list of the given cell, e.g. not being geographical neighbors thereof), and then the ICIC mechanism of the base station of the given cell is used to coordinate and mitigate the missing neighbor interference.

Following are two possible implementations of this solution. The first one (exemplified in FIG. 3) does not involve using X2 signaling monitoring (i.e. X2 signaling over the IP bus) and the second one (exemplified in FIG. 4) involves using X2 signaling monitoring.

Figure 3:
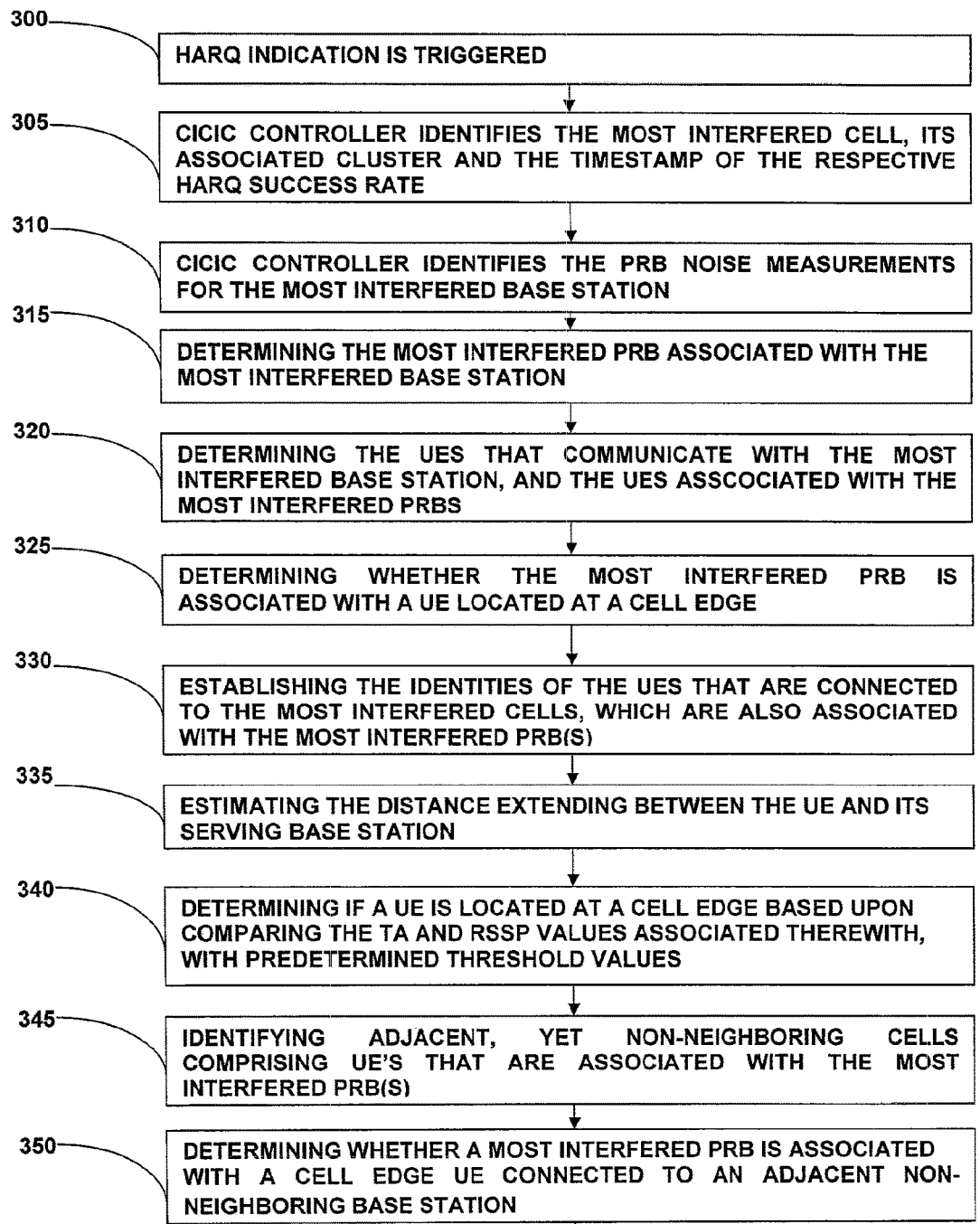
FIG. 3—exemplifies an embodiment of a method for carrying out missing neighbor interference mitigation without X2 signaling monitoring.

FIG. 3 exemplifies an embodiment of a method encompassed by the present invention for carrying out missing neighbor interference mitigation without X2 signaling monitoring, which comprises the following steps:

Once a HARQ indication is triggered (step 300) (i.e. when the HARQ success rate associated with a given wireless cell is less than the average HARQ success rate for the wireless cells included in that cluster to which the given cell belongs, less a factor which is a function of the standard deviation), the cICIC controller identifies (step 305) the one (or more) most interfered wireless cell(s) (e.g. the eNB cell subjected to the larger interferences), the cluster with which it is associated, and the timestamp of the respective HARQ success rate.

The cICIC controller then identifies the PRB noise measurements for each most interfered base station (i.e. the base station (e.g. eNB) of the most interfered wireless cells) (step 310), and from data received along its It-FN bus, the cICIC controller is able to determine (step 315) one (or more) most interfered PRB associated with the most interfered base station(s) (i.e. PRB for sending/receiving communications by the most interfered base station(s)).

The available Radio Resource Control (RRC) Connection Setup information is examined (e.g. by the cICIC controller based on information received along its It-FN bus) in order to determine which are the UEs that are in communication with the most interfered base station, and which UEs are associated with the most interfered PRBs (step 320).

Next, it is determined whether the most interfered PRB is associated with a cell edge UE (step 325), and based on the available RRC Connection Setup information (e.g. retrieved along the cICIC controller It-FN bus), the identities of the UEs that are connected to the most interfered wireless cell which are also associated with the most interfered PRB(s), are established (step 330).

The time adjustment (TA) value and the received signal strength power (RSSP) (e.g. retrieved from the It-FN bus) of the UEs whose identities were established in step 330, provide an indication for the estimated distance extending between the UE and its serving base station (step 335). The TA and RSSP values are compared with predetermined threshold values and if the respective TA value is larger than a first threshold value and the received signal strength power (RSSP) value is less than the second value, the respective UE is determined to be located at a cell edge (step 340).

The cICIC controller maintains a list of base stations that are located at the vicinity of every base station (but not included in its list of neighboring base stations), and a list of neighbors for every base station. The cICIC controller examines the UEs' RRC Connection Setup information in order to identify adjacent, yet non-neighboring wireless cells comprising UEs that are associated with the most interfered PRB(s) (step 345).

Then, the cICIC controller determines whether a most interfered PRB is associated with a cell edge UE connected to an adjacent, non-neighboring base station (step 350), by comparing the TA and RSSP values of each UE connected to an adjacent, non-neighboring base station to predetermined threshold values and if the TA value is found to be higher than the first threshold value and/or the RSSP value is found to be less than the second threshold value, the cICIC controller concludes that the UE of the non-neighboring wireless cell is located at a cell edge.

Thereafter, the cICIC controller compiles a list of adjacent but non-neighboring base stations, which serve the cell edge UEs that are associated with the most interfered PRB(s) (step 355).

Then cICIC controller sends an "add neighbor" command to all of the base stations in the above compiled list (preferably over the IP bus), and following the receipt of this command, the respective base stations that are included in that list, change the status of the most interfered base station (step 360) to a new status, by defining that most interfered base station to be their neighbor. In other words, the cICIC controller initiates a forced neighboring relationship between base stations of wireless cells that are not part of the neighbors' list of the most interfered wireless cell, e.g. they are not geographical neighbors to the most interfered wireless cell, and the base station of the most interfered wireless cell.

Following a predetermined timeout, the cICIC controller reexamines the new value of the HARQ success rate of the most interfered base station in order to determine whether the above procedure has been successful (step 365) (e.g. is the wireless cell that was previously identified as having the most interfered base station, has no longer the most interfered base station). If the above procedure is not found to be successful, the process is reversed by issuing a "delete neighbor" command, thereby removing all the adjacent, non-neighboring base stations from the neighbors' list of the base station that was the most interfered base station (step 370), and of the respective base stations that were defined by the cICIC controller as its neighbors. Steps 305 to 370 are repeated, triggering a new HARQ indication in accordance with step 300.

Figure 4:
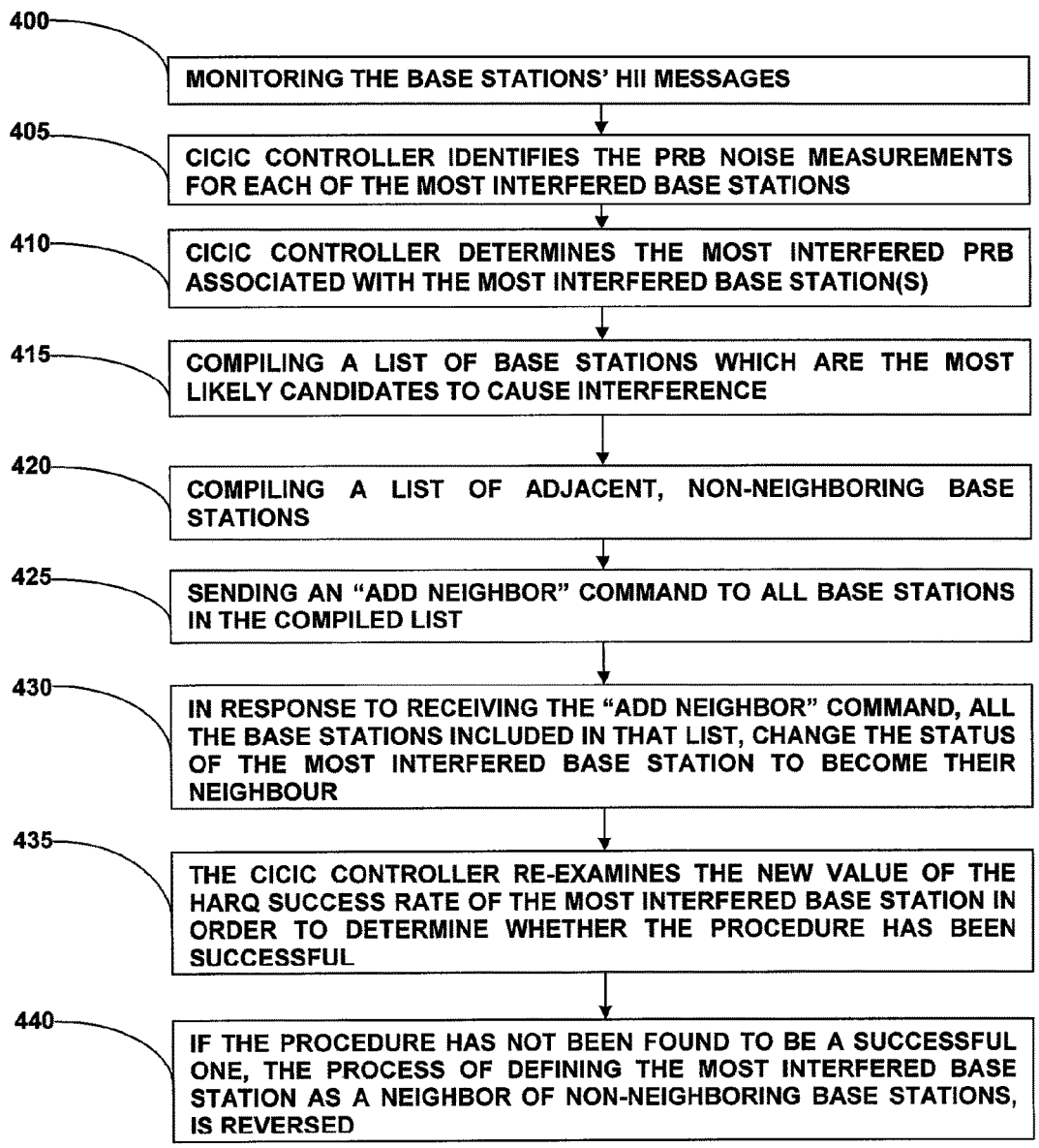
FIG. 4—exemplifies an embodiment of a method for carrying out missing neighbor interference mitigation with X2 signaling monitoring.

FIG. 4 exemplifies an embodiment of a method for carrying out a missing neighbor interference mitigation with X2 signaling monitoring. According to this embodiment, the cICIC controller monitors the base stations' HII messages sent over the IP bus (step 400), where each HII message comprises a list of PRBs that are scheduled to be associated with cell edge UEs. The PRBs are stored and a record thereof is maintained together with its respective base station (or alternatively its respective wireless cell) identity and a timestamp indicating the time at which the HII message was sent.

Once a HARQ indication is triggered as discussed in the previous example (step 300), the cICIC controller identifies the most interfered wireless cell (or alternatively the most interfered base station), the cluster it is associated with, and the timestamp of the respective HARQ events.

The cICIC controller then identifies the PRB noise measurements for each of the most interfered base stations (step 405), and from data received along its It-FN bus, it is able to determine the one (or more) most interfered PRB associated with the most interfered base station(s) (step 410).

The cICIC controller maintains a list of the base stations located at the vicinity of every base station (but not being its geographical neighbor) as well as a list of the adjacent neighbors, for every base station. It then examines the stored records in order to compile a list of the base stations which are the most probable candidates to cause interference based on time proximity between the recorded timestamps of their associated PRBs and the timestamp of the most interfered PRB (step 415). The cICIC controller then compiles a list of adjacent, non-neighboring base stations (step 420) that are associated with the most interfered PRB.

Thereafter, The cICIC controller sends an "add neighbor" command to all base stations included in the above compiled list (preferably over the IP bus) (step 425), and in response to that command, the definition of all these base stations is forcedly changed to become the neighbors of the most interfered base station, and vice versa (step 430).

Following a predetermined timeout, the cICIC controller reexamines the value of the HARQ success rate of the most interfered base station in order to determine whether the above procedure has been successful (step 435) (e.g. is the base station that was identified as the most interfered base station, no longer the most interfered base station), and if not, (step 440) the process is reversed by issuing a "delete neighbor" command, thereby removing all the adjacent, non-neighboring base stations from the neighbors' list of the base station that was the most interfered one, and vice versa. Upon receiving a new HARQ indication, repeating steps 405 to 440).

Figure 5:
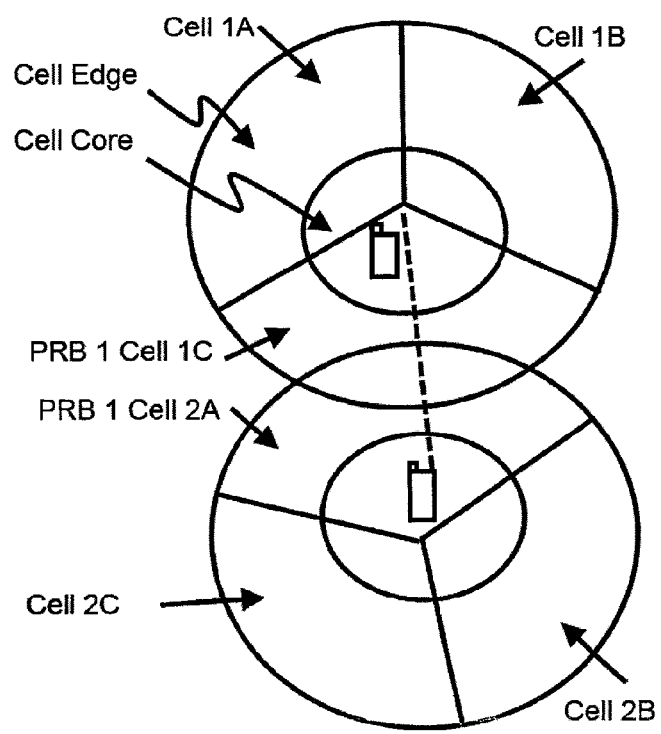
FIG. 5—demonstrates a schematic illustration of a configuration of a wrong PRB mapping interference.

FIG. 5 illustrates a configuration of a wrong PRB mapping, in which cell 1C comprises a UE located at cell center to which PRB1 has been allocated, and Cell 2A, which is geographically adjacent to cell 1C (a neighbor of C1), also comprises a UE at its cell edge using PRB1. Due to the fact that cells 1C and 2A are neighbors of each other and the respective UEs are at cell center, the ICIC mechanism is not activated and the RF transmission by the UE in cell 2A creates UL interference at cell 1C (and vise versa).

According to the solution provided herein for overcoming the wrong PRB mapping interference problem, the potentially interfering cell core PRBs are identified, they are then defined as cell edge PRBs, and then the ICIC mechanism of the base station of the given cell is used to coordinate and mitigate the wrong PRB mapping interference.

Following are two possible implementations of the present solution to overcome this problem. The first one does not involve using X2 signaling monitoring (i.e. X2 signaling over the IP bus) while the second one involves using X2 signaling monitoring.

Figure 6:
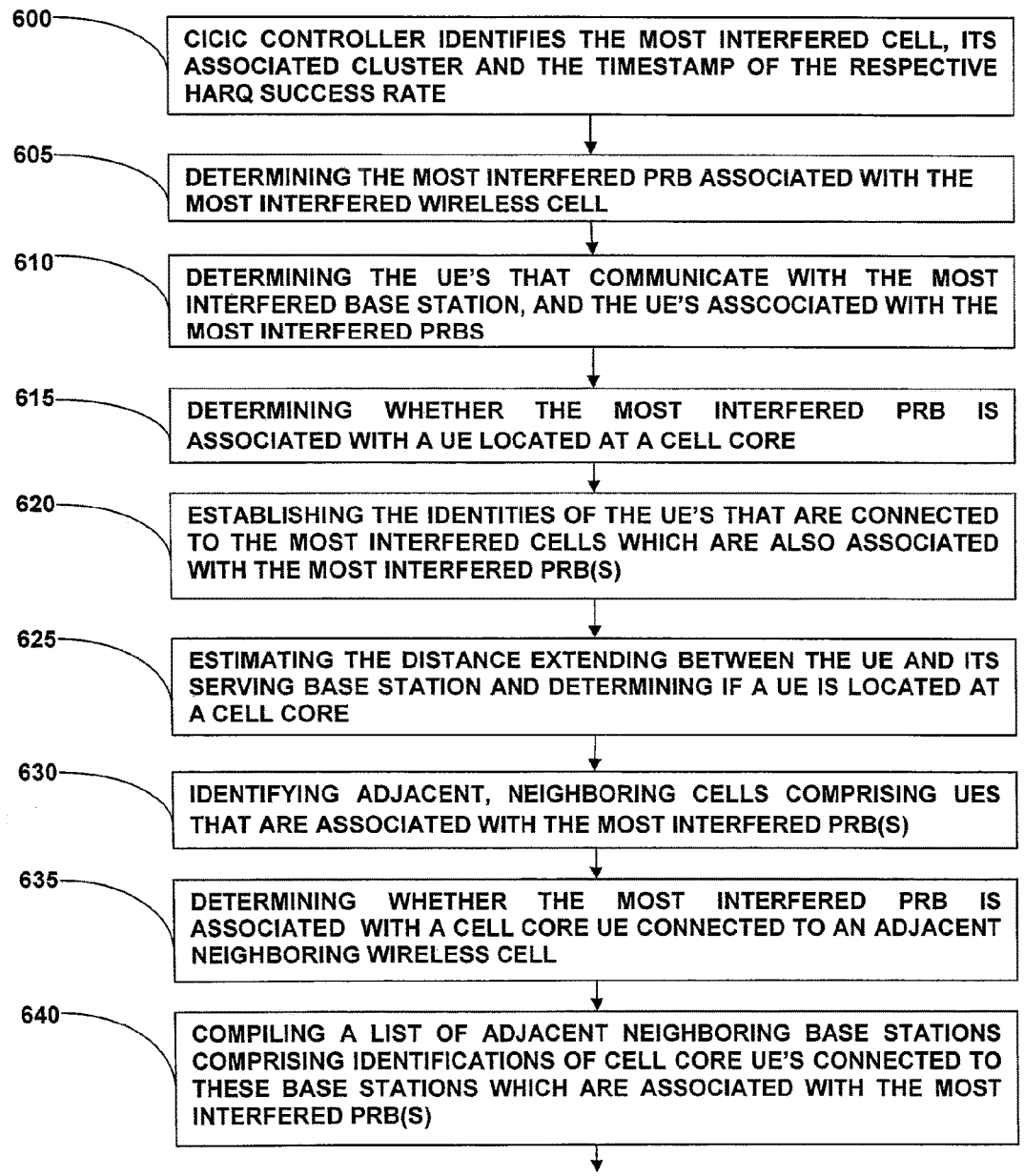
FIG. 6—exemplifies an embodiment of a method for carrying out a wrong PRB mapping interference mitigation without X2 signaling monitoring.

FIG. 6 exemplifies an embodiment of a method for carrying out a wrong PRB mapping interference mitigation without X2 signaling monitoring. The method according to this embodiment comprises the following steps:

Once a HARQ indication is triggered as discussed above (step 300), the cICIC controller identifies (step 600) the most interfered wireless cell (or rather the base station associated therewith), the cluster it is associated with, and the timestamp of the respective HARQ success rate.

The cICIC controller uses the PRB noise measurements of the base station in the most interfered wireless cell (e.g. data received along its It-FN bus), to determine the most interfered PRB associated with the most interfered wireless cell (step 605).

The cICIC controller examines (step 610) the available Radio Resource Control (RRC) Connection Setup information (e.g. information received along its It-FN bus) in order to determine which are the UEs that are associated (e.g. connected) with the most interfered wireless cell, and which UEs are associated with the most interfered PRBs.

Next, it determines whether the most interfered PRB is associated with a cell core UE (step 615), and based on the available RRC Connection Setup information (e.g. retrieved via the cICIC controller's It-FN bus), establishes the identities of the UEs that are connected to the most interfered base station and which are associated with the most interfered PRB(s) (step 620).

The time adjustment (TA) and the received signal strength power (RSSP) values (e.g. retrieved from the It-FN bus) of the UEs whose identities were established, are then applied in order to enable estimating the distance extending between the UE and its respective serving base station. The TA and RSSP values are compared with predetermined threshold values, and if the TA value is found to be less than a first threshold value and/or the RSSP value is found to be over a second threshold value, the respective UE is determined to be located at a cell core (step 625).

The cICIC controller maintains a list of base stations that are located at the vicinity (but not a neighbor) of every base station and a list of the associated neighbors, for every base station. It then examines the UEs' RRC Connection Setup information in order to identify adjacent neighboring wireless cells comprising UEs that are associated with the most interfered PRB (step 630).

Then, the cICIC controller determines whether the most interfered PRB is associated with a cell core UE connected to a base station located in an adjacent neighboring wireless cell (step 635). The cICIC controller compares the TA and RSSP values of each UE connected to an adjacent neighboring base station, with predetermined threshold values and if the TA value is found to be less than that first threshold value and/or the RSSP value is found to be higher than the second threshold value, the cICIC controller concludes that this UE is located at a cell core of the neighboring wireless cell.

Thereafter, the cICIC controller compiles a list of adjacent neighboring base stations that comprises identifications of cell core UEs connected to these base stations which are associated with the most interfered PRB(s) (step 640), and sends (step 645) an X2 HII message to all the base stations included in the list compiled in step 640 (preferably over the IP bus), in which the most interfered PRB, even though it was found to be associated with a cell core UE, would be falsely identified for the base stations as being a cell edge PRB, in order to enable invoking the ICIC mechanism (step 645).

Following a predetermined timeout, the cICIC controller reexamines the value of the HARQ success rate of the most interfered base station in order to determine whether the above procedure has been successful (step 650) (e.g. is the wireless cell that was identified as the most interfered wireless cell, no longer the most interfered wireless cell). If the most interfered wireless cell is still found to be the most interfered eNB cell, an error message will be issued (step 655). Steps 600 to 655 are repeated when a new HARQ indication is triggered.

Figure 7:
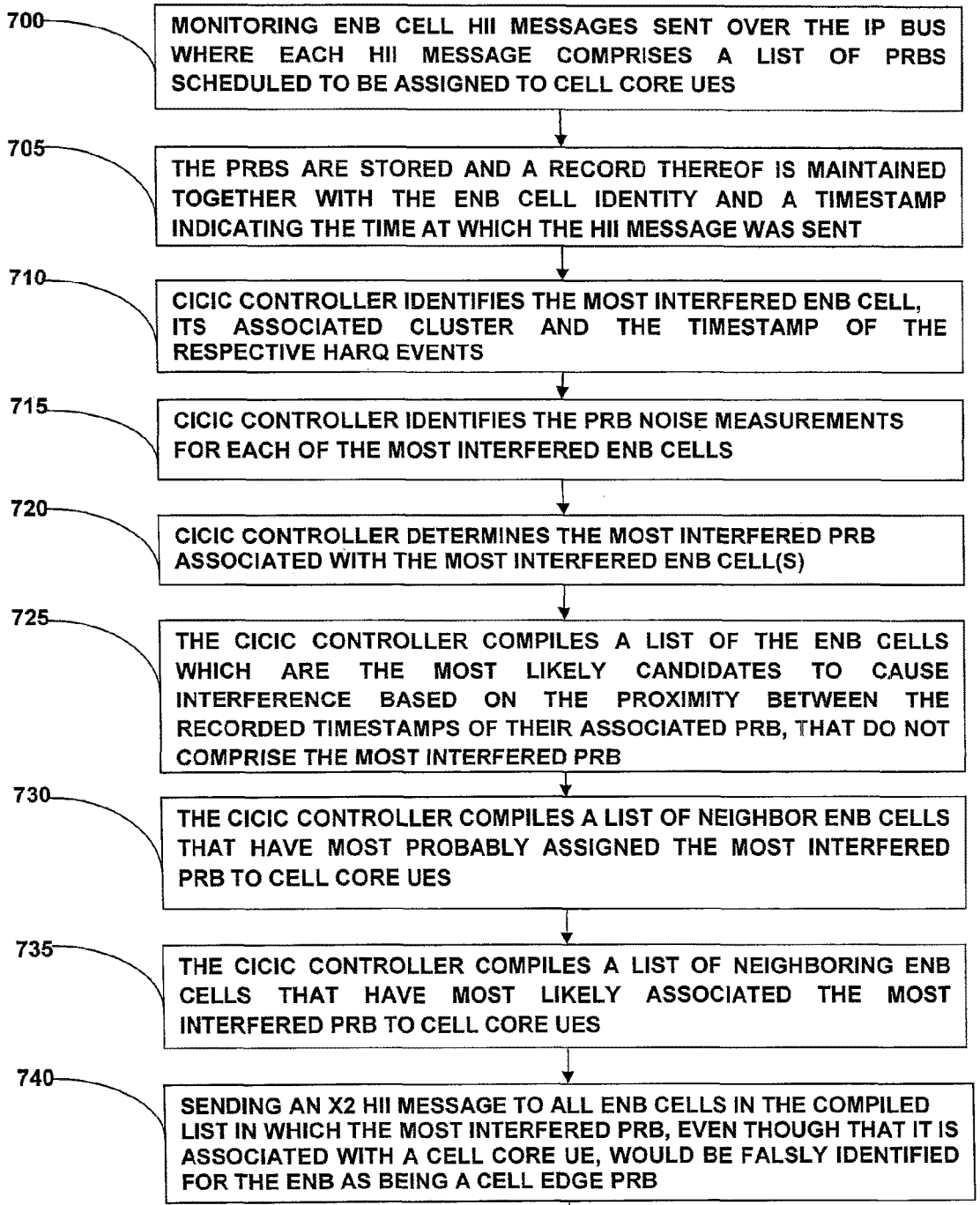
FIG. 7—exemplifies an embodiment of a method for carrying out a wrong PRB mapping interference mitigation with X2 signaling monitoring.

FIG. 7 exemplifies an embodiment of a method for carrying out a wrong PRB mapping interference mitigation with X2 signaling monitoring, which comprises the following steps.

The cICIC controller monitors eNB cell HII messages sent over the IP bus (step 700). Each HII message comprises a list of PRBs that are scheduled to be assigned to cell core UEs. The PRBs are stored and a record thereof is maintained (step 705) together with the eNB cell identity and a timestamp indicating the time at which the HII message was sent.

Once a HARQ indication is triggered as discussed above (see step 300 of FIG. 3), the cICIC controller identifies the most interfered eNB cell, the cluster it is associated with, and the timestamp of the respective HARQ events (step 710).

The cICIC controller then identifies the PRB noise measurements for each of the most interfered eNB cells from data received along its It-FN bus (step 715), and determines (step 720) the one (or more) most interfered PRB associated with the most interfered eNB cell(s).

The cICIC controller maintains a list of the eNB cells that are at the vicinity of every eNB cell, and a list of the associated neighbors for every eNB cell. It examines the stored records in order to compile a list of the eNB cells which are the most probable candidates to cause interference, based on the proximity between the recorded timestamps of their associated PRB that do not comprise the most interfered PRB (step 725). The underlying assumption here is that if the most interfered PRB is not associated with cell edge UEs, it is most probably associated with cell core UEs. The cICIC controller compiles a list of neighbor eNB cells that most probably have assigned the most interfered PRB to cell core UEs (step 730) and compiles a list of neighboring eNB cells that are most likely associated with the most interfered PRB to cell core UEs (step 735).

The cICIC controller sends (step 740) an X2 HII message to all of the eNB cells in the above compiled list (preferably over the IP bus), in which the most interfered PRB even though it is associated with a cell core UE, would be falsely identified for the eNB cells as being a cell edge PRB, in order to enable invoking the ICIC mechanism (step 745).

Following a predetermined timeout, the cICIC controller reexamines the value of the HARQ success rate of the most interfered eNB cell in order to determine whether the above procedure has been successfully conducted (step 747) (e.g. is the eNB cell that was identified as the most interfered eNB cell, is no longer the most interfered eNB cell), but if the most interfered eNB cell still remains the most interfered eNB cell, an error message will be issued (step 750). Steps 700 to 750 are repeated every time a new HARQ indication is triggered.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. For example, determining which wireless cell is the most interfered cell can be done on a PRB basis or on any other applicable time basis which will is applicable to the various wireless cells. The scope of the invention is limited only by the following claims.

The invention claimed is:

1. A method comprising:
identifying, for a cluster of wireless cells comprising a plurality of wireless cells, a first wireless cell that is a most interfered wireless cell of the cluster of wireless cells by comparing a hybrid automatic repeat request (HARQ) success rate to a threshold value;
identifying, for a plurality of radio resources available to the first wireless cell, one or more most interfered radio resources of the plurality of radio resources;
identifying one or more user equipment (UE) associated with the one or more most interfered radio resources for the first wireless cell;
identifying at least one UE associated with the one or more most interfered radio resources for the first wireless cell as a cell edge UE based, at least in part, on at least one of a time adjustment (TA) value and a received signal strength power (RSSP) value associated with the at least one UE;
identifying at least one other UE associated with the one or more most interfered radio resources;
determining whether the at least one other UE is one of:
  a cell edge UE served by a second wireless cell of the cluster of wireless cells, wherein the second wireless cell is not identified in a neighbor list of the first wireless cell; or
  a cell core UE served by a second wireless cell of the cluster of wireless cells, wherein the second wireless cell is identified in a neighbor list of the first wireless cell but no inter-cell interference coordination is provided for the cell core UE,
wherein the at least one other UE is determined to be a cell edge UE or a cell core UE based, at least in part, on at least one of TA value and a RSSP value associated with the at least one other UE;
including the second wireless cell in the neighbor list of the first wireless cell if the at least one other UE is determined to be a cell edge UE for the second wireless cell that is not identified in the neighbor list of the first wireless cell;
falsely identifying the at least one other UE as a cell edge UE if the at least one other UE is determined to be a cell core UE for the second wireless cell that is identified in the neighbor list of the first wireless cell;
determining if the first wireless cell remains the most interfered wireless cell of the cluster of wireless cells by comparing the hybrid automatic repeat request (HARQ) success rate of the first wireless cell to the predetermined threshold; and
issuing an error message based on the determination that the first wireless cell remains the most interfered wireless cell of the cluster of wireless cells.

2. The method of claim 1, further comprising:
calculating the hybrid automatic repeat request (HARQ) success rate for each wireless cell of the cluster of wireless cells;
calculating an average HARQ success rate for the cluster of wireless cells; and
determining a standard deviation of the average HARQ success rate for the cluster of wireless cells.

3. The method of claim 2, further comprising:
comparing a first HARQ success rate calculated for the first wireless cell to the threshold value, wherein the threshold value comprises the average HARQ success rate for the cluster of wireless cells minus the standard deviation of the average HARQ success rate for the cluster of wireless cells; and triggering the identifying of the first wireless cell based, at least in part, on the first HARQ success rate associated with the first wireless cell being less than the threshold value.

4. The method of claim 1, further comprising:

receiving Radio Resource Control (RRC) Connection Setup information associated with the first wireless cell; and determining whether the second wireless cell is identified in the neighbor list of the first wireless cell based on the RRC Connection Setup information.

5. The method of claim 1, further comprising:

monitoring high interference indicator messages transmitted by each wireless cell of the cluster of wireless cells; and recording radio resource allocation information associated with each wireless cell, wherein a radio resource allocation information record for a given high interference indicator message sent from a given wireless cell comprises an identity of the wireless cell, a timestamp associated with the given high interference indicator message, and a list of one or more radio resources allocated to one or more cell edge UE served by the wireless cell, wherein the identifying one or more UE associated with the one or most interfered radio resources is further based on the high interference indicator messages.

6. The method of claim 5, wherein the defining is based, at least in part, on radio resource allocation information recorded for the second wireless cell.

7. The method of claim 6, further comprising:

sending the first wireless cell a high interference indicator message including one or more radio resources associated with the at least one other UE set to indicate that the one or more radio resources are associated with a cell edge UE.

8. The method of claim 1, further comprising inducing a change in a tilt of an antenna associated with at least one of the first wireless cell and the second wireless cell.

9. The method of claim 1, wherein identifying one or more most interfered radio resources further comprises:

determining the one or more most interfered radio resource associated with the most interfered wireless cell based on radio resource noise measurements of a base station in the most interfered wireless cell.

10. The method of claim 1, further comprising:

receiving a Radio Resource Control (RRC) Connection Setup information from the first wireless cell; and determining which UEs are associated with the most interfered wireless cell and which UEs are associated with the most interfered radio resource.

11. A controller comprising:

a memory element for storing data; and a processor to execute instructions associated with the data that, when executed, the controller is configured to:

identify, for a cluster of wireless cells comprising a plurality of wireless cells, a first wireless cell that is a most interfered wireless cell of the cluster of wireless cells by comparing a hybrid automatic repeat request (HARQ) success rate to a threshold value;

identify, for a plurality of radio resources available to the first wireless cell, one or more most interfered radio resources of the plurality of radio resources;

identify one or more user equipment (UE) associated with the one or more most interfered radio resources for the first wireless cell;

identify at least one UE associated with the one or more most interfered radio resources for the first wireless cell as a cell edge UE based, at least in part, on at least one of a time adjustment (TA) value and a received signal strength power (RSSP) value associated with the at least one UE;

identify at least one other UE associated with the one or more most interfered radio resources;

determine whether the at least one other UE is one of:

a cell edge UE served by a second wireless cell of the cluster of wireless cells, wherein the second wireless cell is not identified in a neighbor list of the first wireless cell; or a cell core UE served by a second wireless cell of the cluster of wireless cells, wherein the second wireless cell is identified in a neighbor list of the first wireless cell but no inter-cell interference coordination is provided for the cell core UE, wherein the at least one other UE is determined to be a cell edge UE or a cell core UE based, at least in part, on at least one of a TA value and a RSSP value associated with the at least one other UE;

include the second wireless cell in the neighbor list of the first wireless cell if the at least one other UE is determined to be a cell edge UE for the second wireless cell that is not identified in the neighbor list of the first wireless cell;

falsely identify the at least one other UE as a cell edge UE if the at least one other UE is determined to be a cell core UE for the second wireless cell that is identified in the neighbor list of the first wireless cell;

determine if the first wireless cell remains the most interfered wireless cell of the cluster of wireless cells by comparing the hybrid automatic repeat request (HARQ) success rate of the first wireless cell to the threshold value; and issue an error message based on the determination that the first wireless cell remains the most interfered wireless cell of the cluster of wireless cells.

12. The controller of claim 11, the processor to execute further instructions associated with the data that, when executed, the controller is further configured to:

calculate the hybrid automatic repeat request (HARQ) success rate for each wireless cell of the cluster of wireless cells;

calculate an average HARQ success rate for the cluster of wireless cells; and determine a standard deviation of the average HARQ success rate for the cluster of wireless cells.

13. The controller of claim 12, the processor to execute further instructions associated with the data that, when executed, the controller is further configured to:

compare a first HARQ success rate calculated for the first wireless cell to the threshold value, wherein the threshold value comprises the average HARQ success rate for the cluster of wireless cells minus the standard deviation of the average HARQ success rate for the cluster of wireless cells; and trigger identification of the first wireless cell based, at least in part, on the first HARQ success rate associated with the first wireless cell being less than the threshold value.

14. The controller of claim 11, the processor to execute further instructions associated with the data that, when executed, the controller is further configured to:
receive Radio Resource Control (RRC) Connection Setup information associated with the first wireless cell; and
determine whether the second wireless cell is identified in the neighbor list of the first wireless cell based on the RRC Connection Setup information.

15. The controller of claim 11, the processor to execute further instructions associated with the data that, when executed, the controller is further configured to:
monitor high interference indicator messages transmitted by each wireless cell of the cluster of wireless cells;
record resource allocation information associated with each wireless cell, wherein a radio resource allocation record for a given high interference indicator from a given wireless cell comprises an identity of cell, a timestamp associated with the given high indicator message, and a list of one or more radio resources allocated to one or more cell edge UE served by the wireless cell; and
identify one or more UE associated with the one or most interfered radio resources based further on the high interference indicator messages.

16. The controller of claim 15, wherein the at least one other UE is defined as a cell edge UE based, at least in part, on radio resource allocation information recorded for the second wireless cell.

17. The controller of claim 16, the processor to execute further instructions associated with the data that, when executed, the controller is further configured to:
send the first wireless cell a high interference indicator message including one or more radio resources associated with the at least one other UE set to indicate that the one or more radio resources are associated with a cell edge UE.

18. The controller of claim 11, the processor to execute further instructions associated with the data that, when executed, the controller is further configured to:
induce a change in a tilt of an antenna associated with at least one of the first wireless cell and the second wireless cell.

19. The controller of claim 11, the processor to execute further instructions associated with the data that, when executed, the controller is further configured to:
determine the one or more most interfered radio resource associated with the most interfered wireless cell based on radio resource noise measurements of a base station in the most interfered wireless cell.

20. The controller of claim 11, the processor to execute further instructions associated with the data that, when executed, the controller is further configured to:
receive a Radio Resource Control (RRC) Connection Setup information from the first wireless cell; and
determine which UEs are associated with the most interfered wireless cell and which UEs are associated with the most interfered radio resource.

* * * * *